(12) United States Patent
Mader et al.

(10) Patent No.: US 7,984,693 B2
(45) Date of Patent: Jul. 26, 2011

(54) DEVICE AND METHOD FOR REMOVING TEAT CUPS

(75) Inventors: Thomas Mader, Rheda-Wiedenbrück (DE); Andreas Springer, Beckum (DE)

(73) Assignee: Gea Farm Technologies GmbH, Bonen (DE)

( * ) Notice: Subject to any disclaimer, the term of this patent is extended or adjusted under 35 U.S.C. 154(b) by 572 days.

(21) Appl. No.: 11/660,827

(22) PCT Filed: Aug. 31, 2005

(86) PCT No.: PCT/EP2005/009358
§ 371 (c)(1),
(2), (4) Date: Jul. 28, 2008

(87) PCT Pub. No.: WO2006/024506
PCT Pub. Date: Mar. 9, 2006

(65) Prior Publication Data
US 2009/0229527 A1   Sep. 17, 2009

(30) Foreign Application Priority Data
Aug. 31, 2004 (DE) .......................... 10 2004 042 088

(51) Int. Cl.
*A01J 5/04* (2006.01)
(52) U.S. Cl. .................................. 119/14.08; 119/14.47
(58) Field of Classification Search ............... 119/14.02, 119/14.1, 14.08, 14.16, 14.47, 14.48
See application file for complete search history.

(56) References Cited

U.S. PATENT DOCUMENTS

| | | | | |
|---|---|---|---|---|
| 2,416,139 A | * | 2/1947 | Babson | 119/14.14 |
| 3,738,321 A | * | 6/1973 | Hicks | 119/14.45 |
| 4,005,680 A | * | 2/1977 | Lole | 119/14.08 |
| 4,408,564 A | | 10/1983 | Flocchini | |
| 6,269,766 B1 | * | 8/2001 | Birk | 119/14.1 |
| 6,334,406 B1 | * | 1/2002 | Eriksson | 119/14.02 |
| 6,357,387 B1 | * | 3/2002 | Johannesson | 119/14.47 |
| 6,463,877 B1 | | 10/2002 | van der Lely | |
| 6,684,809 B1 | | 2/2004 | Sjolund | |
| 6,948,449 B2 | * | 9/2005 | Van der Lingen et al. | 119/14.13 |

FOREIGN PATENT DOCUMENTS

| | | |
|---|---|---|
| DE | 39 31 769 A1 | 4/1991 |
| WO | WO 93/0002 | 1/1993 |
| WO | WO 02/15676 A1 | 2/2002 |

OTHER PUBLICATIONS

English language Abstract, Translated Description and Claims of DE 39 31 769 A1, European Patent Office's esp@cenet.com database, 4pp.

* cited by examiner

*Primary Examiner* — Rob Swiatek
*Assistant Examiner* — Ebony Evans
(74) *Attorney, Agent, or Firm* — Smith Law Office

(57) ABSTRACT

A device and a method for removing teat cups from the teats of a lactating animal, having at least two traction members driven by a common drive for removing the teat cups; and at least one clutch is provided for coupling the traction member to the common drive.

33 Claims, 1 Drawing Sheet

DEVICE AND METHOD FOR REMOVING TEAT CUPS

FIELD AND BACKGROUND OF THE INVENTION

The present invention relates to a device for removing teat cups comprising traction members driven by a drive for each teat cup to be removed from a teat of the animal to be milked in the direction of a teat cup magazine.

The invention will be described below with respect to the milking of cows. It is pointed out though that the present invention is also suitable for milking methods and milking devices for milking sheep, goats, camels, dromedaries, buffaloes, yaks, elks, horses, and other lactating animals. The invention may be applied in conventional milking, machine milking, and semi-automatic milking. Application is also conceivable in systems where the teat cups are placed to the animal teats semi-automatically or fully automatically or robot-assisted and/or computer-controlled.

A device for removing teat cups of a milking unit from the teat of an animal is known for example from U.S. Pat. No. 6,463,877. In this known prior art, two pairs of parallelogram arms of an articulated parallelogram structure, each of which arms forming a teat cup magazine for one single teat cup, grip beneath the animal to be milked to both sides of the animal to be milked. Preparation, i.e. placing the teat cups on the teats, occurs by pivoting the arms of the parallelogram structure, thus lifting the teat cups up toward a teat. After set-up the parallelogram arms with the teat cup magazines are pivoted to take a rest position.

During milking the teat cups are thus freely suspended, being held to the teats by way of the suction vacuum. Each of the associated teat cup. When milking has ended, the drive is actuated so as to retract the traction member into the parallelogram structure in the region of the teat cup magazine and to remove the corresponding teat cup from the teat. The associated teat cup is held substantially vertical by holding ropes fastened in the region of the upper teat cup edge and held under tension by way of driven winches above the teat cups and to the side of the animal to be milked.

The known device does allow to remove the teat cups individually from each quarter meaning that each teat cup is removed separately and gently, thus enhancing the well-being of the animal to be milked. However, due to the considerable quantity of mechanical components the device has been found to be too costly and prone to failure.

SUMMARY OF THE INVENTION

The present invention is correspondingly based on the problem of providing a simplified and reliably operating device for removing teat cups.

The device according to the invention for removing teat cups from the teats of a lactating animal comprises at least two traction member driven by one common drive for removing or retracting the teat cups. Furthermore at least one clutch is provided for coupling the traction members to the common drive.

The method according to the invention for removing teat cups from the teats of a lactating animal is carried out with at least two traction members driven by one common drive for removing the teat cups and with at least one clutch. For removing or retracting the teat cups the associated traction members coupled with the common drive.

The development of the prior art according to the invention results in a considerably simplified structure of the device according to the invention. Actuating the clutch allows to establish a functional connection of the separate, individually controlled traction members with the drive, such that each teat cup associated with its traction members can be separately removed from the teat, i.e. separately for each quarter.

Compared to the cited prior art the device according to the invention comprises traction members driven by one common drive which reduces the number of the components required for realizing the device such that not only the manufacturing costs are reduced but also the proneness to failure is perceptibly lower in the device according to the invention. The dimensions of the device can also be considerably reduced.

The traction members of the device can be coupled individually and in particular separately from one another. The clutch can be controlled automatically and is preferably controlled by the milking control program. As the removal time for the individual teat cup is reached, the clutch is activated and the drive switched on. Alternatively the drive may continuously remain in operation during milking such that only the clutch needs to be activated for removing. The associated control member provided may be an external members.

Preferably one traction member is provided per teat such that milking installations e.g. for cows provide for four traction members which can preferably be coupled individually to allow separate removal for each quarter.

It is conceivable to provide a first common drive and additionally a second common drive. A device for an animal having four teats then provides the first common drive in particular for removing two teat cups and the second common drive for removing the two remaining teat cups. The first common drive may e.g. be provided for the two front teats of a cow's udder and the second common drive for the two rear teats or the rear half with removal occurring individually for each quarter since the respective traction member and thus the teat cups can be coupled up.

Or, the first common drive may e.g. be provided for the quarters on the right and the second common drive e.g. for the quarters on the left, again with removal occurring individually for each quarter. Two separate drives may be useful e.g. to meet specific size requirements. The peak power requirements are also lower with only two teat cups per drive given two drives, such that this solution may be preferred for other reasons as well.

The device according to the invention can be realized simply and cost-effectively without omitting in the device specific features which are preferred in view of simple and reliable handling. These specific features can be realized by manipulating the central drive. For example it is conceivable in particular where drive occurs through an electric motor to provide a torque monitor for controlling the drive.

To protect the milking unit and/or the animals to be milked a central torque limit may further be formed for the drive to prevent excessive traction forces from being applied to the traction members. Such control elements may be centrally adjusted to the current operating conditions which reduces work required for adapting the device.

For example it is conceivable to limit the maximum traction force in removing the teat cup sitting on the teat. It depends in particular on the projected cross-section area of the teat and should thus be preset for the corresponding use of the device. The devices known in the prior art all require a structural adaptation, depending on whether the device for removing teat cups should be individually adapted to different teat sizes e.g. for sheep or goat herds or cow herds. The device according to the invention provides that only the central motor control, specifically the torque limit of the motor, needs to be modified.

A preferred specific embodiment of the device according to the invention provides for a separate winding drum for each teat cup, wherein at least two and preferably all of the teat cup winding drums are driven by one common drive and wherein said winding drums can be coupled with the drive controlled via a clutch.

This specific embodiment affords separate teat cup removal from each quarter of the udder of the animal to be milked since all the winding drums can be selected separately and coupled to the winding drum drive. Accordingly, individual winding drums can selectively be coupled to the drive. If required, one winding drum may be temporarily connected to the drive to thus remove the associated teat cup from the corresponding teat and to displace it in the direction of the teat cup magazine, preferably to retract it into the teat cup magazine.

The milking unit indicated above comprises teat cups corresponding to the number of teats of the animal to be milked. In other words, the device comprises as many winding drums as the animal to be milked possesses teats, which drums are driven via a common drive and individually controlled via the clutch.

In view of a further simplification of the inventive device, a preferred specific embodiment of the invention proposes to provide a shaft driven by the central drive and carrying the respective winding drums with the associated clutches placed in-between. In this preferred embodiment the clutch is positioned between a winding surface for the traction element of the respective winding drums and the outer peripheral surface of the shaft. In respect of the most compact configuration possible in the axial direction of the shaft said winding surface is preferably provided radially outwardly of the clutch. With the clutch disengaged, the winding drum runs free on the shaft, permitting transfer of the drive torque only after selection of the clutch.

Said clutch may be an electromagnetic clutch which offers the advantage that comparatively high torques are reliably transmitted, coupling occurs quietly, high switching rates and short switching times can be achieved, and wear is minimal.

According to a specific embodiment of the present invention said shaft is directly connected with a drive shaft of the drive, resulting in a simple and low-cost configuration which in particular does not require a transmission between the drive shaft and the shaft.

The traction members of the device according to the invention may be or comprise a rope, a belt, a chain, or a winch or the like. In the same way the milk lines extending between each teat cup and a remote collection element may serve as the traction members. Correspondingly the device preferably comprises a friction drive provided between the motor and the traction members with the latter being in particular formed by the milk line mentioned above. Said traction members may comprise or be configured as the short or the long milk hose. Omitting separate traction members will reduce the risk of the elongated traction members or the milk lines getting tangled.

Not least in respect of a neat routing and arrangement of the traction members, even with the teat cups removed, it has been found advantageous to configure the drive by way of a lifting cylinder and to adapt the clutch such that the teat cups, being controlled by the clutch, can be coupled to a mobile end of the lifting cylinder. In this configuration, actuating the lifting cylinder will not only cause the traction members to remove the teat cups but simultaneously provide for the traction members and/or the milk lines to be suspended in a predetermined way after removal of the teat cups from the teats. To this end, the clutch or a separate hose clamp allows the traction members to be fixed to a suspension preferably with the teat cup removed.

The clutch therefore preferably comprises a clamping members or a clamp or a gripping members to grip the traction members of the associated teat cup and after teat cup removal, to disengage from the drive and/or from the traction members. The comparatively large free length of the traction members after teat cup removal from the teats can be neatly deposited even with little drive actuation when said drive comprises a set of pulleys for the traction members as proposed with a preferred embodiment of the present invention. The basic principle of a pulley system and a lifting cylinder acting on said system is known for example from U.S. Pat. No. 4,408,564.

According to another preferred embodiment of the present invention the traction member is configured such that the associated teat cup is taken into the teat cup magazine by way of pulling the traction members. Accordingly the traction members of the inventive device serves not only to cover the distance between the udder of the animal to be milked and the teat cup magazine. It is also possible to directly retract the teat cups to their initial positions i.e. into the teat cup receiving spaces of the teat cup magazine by pulling the traction mechanism.

The teat cup magazine preferably comprises an uptake for each teat cup of the milking unit. A rinsing adapter may be provided there to allow rinsing the teat cups.

According to another preferred embodiment of the present invention the device for removing teat cups comprises a velocity control members which may be configured e.g. as an angle velocity control members. The velocity control member is preferably set up such that the teat cup is firstly removed from the teat in a first main phase at low velocity, then in a further main phase displaced in the direction toward the teat cup magazine at high velocity and finally in a finishing main phase it is taken into the cup magazine at low velocity.

The further main phase may be the second main phase which may start with removal of the teat cups. The finishing main phase may be the third main phase ending with the teat cup being received in the teat cup uptake or the cup magazine.

The velocity control members allows an individual, gentle retraction, i.e. removal of each teat cup from the teats of the animal to be milked. In the second phase the teat cup is moved toward the teat cup magazine at a high velocity. Said increased velocity should preferably be selected so as to prevent a contact of the teat cup with the floor. In this way one can avoid the complicated constructions known from the mentioned prior art where the teat cup removed from the teat must be held by separate retaining ropes tensioned by winches until the teat cup is received in the teat cup magazine.

The device according to the invention can generally be realized with a wide variety of drives e.g. electric motors such as DC motors, servomotors, stepping motors, or pneumatic motors or hydraulic motors or the like. For a simple realization of the angle velocity control member it is preferred to employ for drive an electric motor whose rotational speed is readily variable by way of the velocity control member to set the desired velocities in the different phases of movement.

Preferred specific embodiment provide at least one sensor for sensing a rate for the torque. The sensor may be configured as a torque sensor. It is also conceivable to sense the current strength of the electric motor and to therefrom infer the existing torque. If the torque should exceed a given rate, the drive may be stopped to avoid injury to the animal or damage to the system.

Furthermore such a sensor is well suited to control the device in normal operating conditions by controlling the velocity curve of the traction member in relation to the measured torques.

Preferred specific embodiments of the invention provide for at least one proximity sensor. A proximity sensor may be employed to control the process flow since the covered distance of retraction may be used to infer the current position of the teat cup.

Preferably at least one angle sensor or a turning angle transmitter is provided. A turning angle transmitter may for example be provided at the drive shaft of the common drive and one turning angle transmitter may be provided at each winding drum. The individual signals may be used to derive the positions of each teat cup.

According to another preferred embodiment of the present invention, the beginning of the second main phase is specified by the winding distance covered during the first main phase. Consequently the velocity control member checks by way of the winding distance traveled in the first phase whether the associated teat cup is already completely removed from the teat. A suitable winding distance covered in the first phase may be defined as a winding distance corresponding to the maximum length of a teat received in the teat cup.

The end of the second main phase is preferably specified by a pulse transmitted by a sensor associated to the cup magazine as the teat cup enters its associated teat cup uptake formed at the teat cup magazine. This sensor may be a pressure sensor provided at the entry of the teat cup uptake. Alternatively, an inductive or capacitive sensor may be provided for detecting the presence of the teat cup.

According to an alternative configuration the end of the second main phase is specified by the winding distance traveled in said phase. This preferred configuration generally provides for the position of the teat cup at the beginning of the retracting motion to be known which leads to the further requirement of providing corresponding detection members. Although this configuration may be more expensive and complicated, it affords a velocity control that is more accurate and adjusted to the phases indicated above. Controlling by way of the winding distance traveled may occur either directly, i.e. based on a measured winding distance traveled for example by monitoring the traction member movements. Alternatively, distance control may occur indirectly, for example by way of monitoring the winding times. This is because with the winding speed known and in the absence of slip the winding distance traveled can be computed from the corresponding winding duration.

Alternatively, a location-based control may be realized if the device comprises at least one distance measuring device and/or an turning angle transmitter for determining the current position of each teat cup.

In view of the most accurate and efficient control possible for the individual phases it is preferred to have the velocity control member determine the beginning of the first phase by monitoring the torque applied by the drive. In this particularly preferred specific embodiment the traction member may, during milking, firstly extend tension-free between the winding drum and the teat cup so as to allow some freedom of movement to the animal to be milked while teat cups will not be removed from the udder of the animal to be milked due to inherent tension in the traction members.

During milking the milk flow is mostly determined by a flow meter which determines the volumetric flow rate of the extracted milk. For separately measuring each teat, every teat cup comprises a flow meter downstream. Near the end of the milking phase for one teat the corresponding traction member of the teat cup of that teat is coupled separately, individually, and automatically to the common drive and the traction member is tensioned between the winding drum and the corresponding teat cup. With a sufficient tension that does not yet cause relative movement between the teat cup and the teat of the animal to be milked but that exceeds a critical threshold value for the torque, the velocity control member emits a signal to indicate the beginning of the first phase.

Thereafter the three phases indicated above for retracting the teat cup indicated above are performed. The same process is performed one by one for each of the other teat cups of the milking unit.

According to another preferred configuration of the present invention, which allows a compact structure of the device, the teat cup magazine comprises one uptake for each teat cup of the milking unit. All of the teat cups of a milking unit are then retained closely spaced in the rest position in the common teat cup magazine. This arrangement affords the possibility for centrally cleaning or disinfecting each teat cup between successive milking operations. Such disinfection may for example be performed by transporting the teat cup magazine including all of the teat cups to a cleaning and disinfection station. With common traversing movements for all of the teat cups all of the clutches may be engaged or disengaged which further simplifies the device. In the case first mentioned the traversing movement of the magazine is traced by correspondingly actuating the drive.

Near the end of milking it may occur that two teat cups are to be removed from the teats more or less simultaneously. Depending on the drive for the traction member it may be advantageous to control such a request recognized by the control in that a first teat cup of the two teat cups to be removed simultaneously is removed first and the second thereafter. This method is also conceivable in case that two teat cups ought to be removed not simultaneously but at overlapping times. If both teat cups are removed simultaneously which is not a problem due to the equal velocity of the traction member coupled with a motor, the clutch should be continuous to allow deliberate clutch drag. In this way the removal velocities can be set individually for each teat cup although all of the traction members are coupled to the same drive.

The present invention allows individual removal for each quarter, i.e. removal of teat cups from the teat of an animal to be milked. Since the winding drums can be coupled to the drive controlled by clutches, multiple winding drums may simultaneously be coupled with the drive so as to offer the possibility of retracting multiple or all of the teat cups by the traction member or to allow their controlled movement.

Further advantages and embodiments of the present invention follow from the embodiment which will now be described with reference to the figures.

DETAILED DESCRIPTION OF THE PREFERRED EMBODIMENTS

Figure 1:
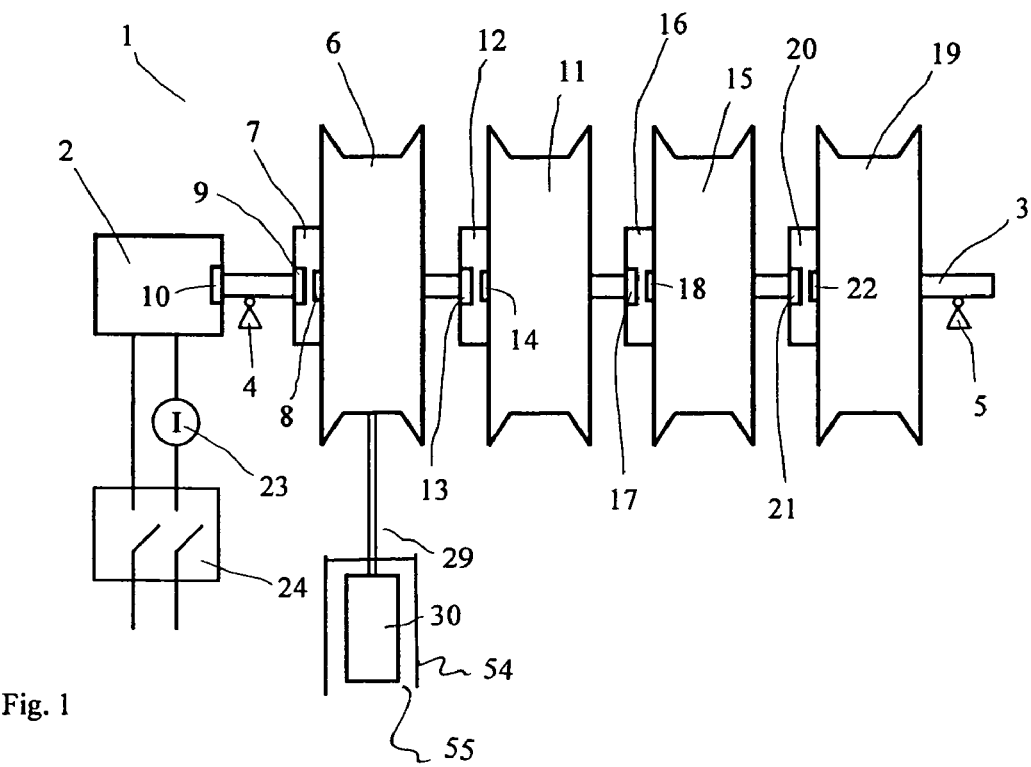
FIG. 1 a device according to the invention in a schematic side view.

FIG. 1 is a very simplified schematic illustration of a device 1 for removing teat cups. The device comprises a common drive configured as an electric motor 2 which comprises a drive shaft 3. By means of the common drive all of the teat cups can be removed from the teats of the milked animals. Other configurations may provide for two drive motors wherein each drive motor serves for individually removing two teat cups.

The drive shaft 3 has a winding drum 6 positioned on it which serves for winding a rope 29. The rope 29 is connected with a first teat cup 30. Between the drive shaft 3 and the winding drum 6, a clutch 7 is provided, by means of which the winding drum can be coupled to the drive shaft. The clutch may establish a non-rotating connection or else allow a drag position in which only an adjustable portion of the rotational movement of the drive shaft 3 is transmitted to the winding drum 6. This will allow to achieve a controlled rotational velocity of the winding drum 6 variable between stationary and the maximum speed even with the rotational speed of the drive shaft 3 constant. In relation to the design the rotational speed of the drive shaft may additionally be variable.

Via the rotational speed of the winding drum 6 the removal and retraction velocity of the associated teat cup 30 is set.

According to another preferred configuration of the present invention, which allows a compact structure of the device, a teat cup magazine 54 comprises one uptake 55 for each teat cup of the milking unit. All of the teat cups of a milking unit are then retained closely spaced in the rest position in the common teat cup magazine 54. This arrangement affords the possibility for centrally cleaning or disinfecting each teat cup between successive milking operations. Such disinfection may for example be performed by transporting the teat cup magazine 54 including all of the teat cups to a cleaning and disinfection station. With common traversing movements for all of the teat cups all of the clutches may be engaged or disengaged which further simplifies the device. In the case first mentioned the traversing movement of the magazine is traced by correspondingly actuating the drive.

An angle sensor 10 or the like serves to sense and monitor or to control the rotational speed of the drive shaft 3 overall.

An angle sensor 9 may be provided at the winding drum 6 to determine the relative rotational speed between the drive shaft 3 and the winding drum 6. The measured values are evaluated by a control member (not shown) to therefrom determine the absolute rotational speed of the winding drum 6 and thus the removal or retraction speed of the associated teat cup. Instead of an angle sensor 9 sensing the relative rotational movement between winding drum 6 and drive shaft 3, an absolute angle sensor may be provided for absolutely sensing the rotational movement of the winding drum 6, e.g. relative to a housing surrounding the device.

The power consumption of the drive motor 2 is captured by a power monitor system 23. If a limiting current is exceeded, the drive is switched off via the contact 24 to avoid injury to the animal or damage to the system.

The force with which the winding drum pulls the teat cup is captured by a suitable sensor. This may be a torque sensor 8 to sense the torque between drive shaft 3 and winding drum 6. Via the drive torque of the motor 2 which may be derived e.g. via the power consumption of the motor, the actual traction force on the teat cup associated with the winding drum 6 is then determined. The torque sensor 8 also may sense the absolute torque.

For the other teats of a cow, winding drums 11, 15, and 19 are provided which in analogy comprise corresponding clutches 12, 16 and 20. For determining the angular position, angle sensors 13, 17 and 21 are provided each. The torques are determined via sensors 14, 18 and 22.

The teat cups can preferably be retracted into a teat cup magazine by way of the traction members.

Figure 2:
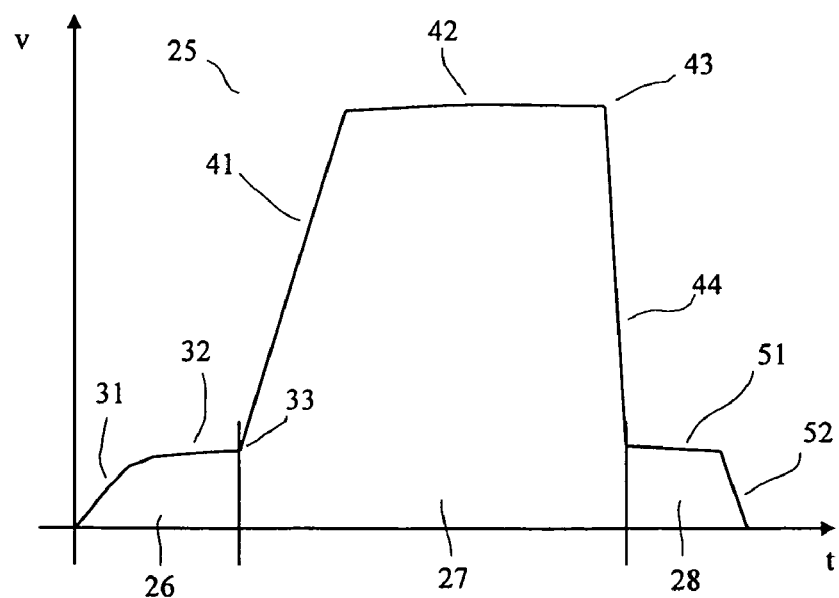
FIG. 2 the removal velocity over time in removing a teat cup using the device in FIG. 1.

FIG. 2 shows a schematic illustration of the curve 25 of the speed of the traction device such as a rope 29 during removal of a teat cup 30 over the time.

The removal and retraction process can be divided into three main phases 26, 27 and 28 overall. In the first main phase 26, engaging the clutches firstly causes an increase 31 of the velocity until a first low velocity 32 is reached. The slack rope 29 is retracted at this velocity until it is tensioned at the time 33. This is derived e.g. from the torque which is continuously monitored and increases with increasing rope tension. At this time for example the vacuum in the teat cup is turned off to allow gentle retraction. Shortly thereafter the removal velocity greatly increases at the beginning of the second main phase 27. This occurs in the accelerating phase 41.

The teat cup then drops off the teat since the tensile force exceeds the diminishing vacuum in the teat cup. This allows a removal particularly gentle on the teats since removal does not occur under a full vacuum but not before the vacuum is minimized.

To prevent the teat cup from falling in the dirt that may be present on the floor, the retracting speed greatly increases, remaining high during the high speed phase 42. Despite the gentle removal, contamination of the teat cup can largely be prevented since the removal and retraction or withdrawing speed is high enough for the teat cup 30 to be retracted to the side so fast that as a rule it will not contact the floor.

When by means of the integrated angle speed or a separate sensor it is recognized at the time 43 that the teat cup comes near the final position or near the teat cup uptake, the finishing third main phase 28 is initiated. The third main phase 28 begins with a decelerating phase 44 in which the rotational speed is reduced, followed by a retraction phase 51 in which the teat cup is slowly withdrawn. Finally there occurs a slow stopping in the phase 52 in which the teat cup is placed in the teat cup uptake.

The slow and gentle leading into the teat cup uptake reliably prevents damage to the teat cup uptake and to the teat cup.

The invention claimed is:

1. A device for removing teat cups from the teats of a lactating animal, the device comprising:
    a common drive;
    a clutch having a clamping device for movement between an unengaged position and an engaged position, wherein the clutch in the engaged position is in releasable contact with the common drive;
    a plurality of traction members, and each traction member is joined to a corresponding teat cup wherein at least one traction member is engaged with the common drive when the clutch is in the engaged position; and
    a plurality of winding drums and each winding drum engages a corresponding traction member.

2. The device according to claim 1, and further comprising:
    a teat cup magazine disposed to receive a teat cup after the teat cup is removed from the lactating animal.

3. The device according to claim 1, wherein four traction members are provided.

4. The device according to claim 3, and further comprising:
    a second common drive; and
    a second clutch for movement between an unengaged position and an engaged position, wherein the second clutch in the engaged position is in releasable contact with the second common drive.

5. The device according to claim 3, and further comprising:
a shaft for engagement with the common drive and wherein the shaft engages all of the winding drums of the milking unit, and the clutch is disposed between the shaft and at least one traction member.

6. The device according to claim 1, wherein each traction member comprises a rope.

7. The device according to claim 1, and further comprising: a shaft fixed to all of the winding drums.

8. The device according to claim 1, wherein the clutch comprises a friction drive disposed between the common drive and at least one traction member.

9. The device according to claim 1, wherein each traction member comprises a milk line connected to a corresponding teat cup.

10. The device according to claim 1, wherein the common drive comprises a lifting cylinder, and the lifting cylinder has a mobile end connected to a traction member when the clutch is in the engaged position.

11. The device according to claim 1, wherein the common drive comprises a pulley for supporting at least one traction member.

12. The device according to claim 1, wherein each traction member extends through a teat cup magazine so that a corresponding teat cup is pulled into the magazine.

13. The device according to claim 1, and further comprising a velocity control device engaged with at least one traction member.

14. The device according to claim 1, wherein the common drive comprises:
an electric motor; and
a velocity controller for changing the rotational speed of the motor.

15. The device according to claim 1, and further comprising a sensor for sensing a rate of torque in the common drive.

16. The device according to claim 1, and further comprising a distance sensor disposed to sense a distance of a teat cup from the sensor.

17. The device according to claim 1, and further comprising an angle sensor disposed to sense an angular speed of the common drive.

18. The device according to claim 1, and further comprising an angle sensor disposed to sense a change in a rotational angle of the common drive.

19. A method for removing teat cups from the teats of a lactating animal, the method comprising the steps of:
operating a common drive;
engaging a clutch with a clamp to at least partially couple the clutch with the common drive; and
tensioning a plurality of traction members with the common drive to wrap at least a portion of each traction member around a corresponding winding drum and remove a corresponding teat cup by engaging the clutch.

20. The method according to claim 19, and further comprising the step of:
starting the common drive at the end of milking the lactating animal to remove an associated teat cup from the lactating animal.

21. The method according to claim 19, and further comprising the step of:
simultaneously coupling at least two traction members to the common drive to remove two teat cups from the lactating animal's teats when the clutch is at least partially coupled with the common drive.

22. The method according to claim 19, wherein the step of driving a plurality of traction members comprises the step of at least partially coupling the common drive with each traction member at spaced apart intervals.

23. The method according to claim 19, and further comprising the step of:
at least partially coupling each traction member to the common drive at spaced apart intervals so that only one of the traction members is coupled to the common drive for a first time period and at least two traction members are coupled to the common drive for a second time period.

24. The method according to claim 19, wherein the step of tensioning a plurality of traction members comprises the step of retracting the teat cups into a teat cup magazine.

25. The method according to claim 19, and further comprising the step of controlling a retraction velocity of the traction members.

26. The method according to claim 19, wherein the step of tensioning a plurality of traction members comprises the step of:
retracting one of the traction members in a first phase at a relatively low velocity and retracting that traction member in a second phase at a relatively high velocity than in the second phase.

27. The method according to claim 26, and further comprising the step of:
retracting the traction member in a third phase at a relatively higher velocity.

28. The method according to claim 27, wherein the end of the third phase is determined by predetermined winding distance traveled by a traction member during the third phase.

29. The method according to claim 26, and further comprising the step of:
retracting the traction member into a final position in a finishing phase at a relatively low velocity.

30. The method according to claim 26, and further comprising the step of:
beginning a third phase of retracting the traction member at a time that corresponds to a distance traveled by the traction member during the first phase.

31. The method according to claim 19, and further comprising the step of:
controlling with a velocity controller a rotational speed of the common drive.

32. The method according to claim 31, wherein the velocity controller begins a first phase of retracting the tension member when a predetermined torque is applied by the common drive to the clutch.

33. The method according claim 19, and further comprising the step of:
emitting from a sensor a pulse associated with a teat cup magazine as a teat cup enters the teat cup magazine.

* * * * *